United States Patent
Gopalakrishnan et al.

(10) Patent No.: US 11,489,472 B2
(45) Date of Patent: Nov. 1, 2022

(54) CURRENT SOURCE INVERTER CONTROL SYSTEMS AND METHODS

(71) Applicant: GM GLOBAL TECHNOLOGY OPERATIONS LLC, Detroit, MI (US)

(72) Inventors: Suresh Gopalakrishnan, Troy, MI (US); Chandra S. Namuduri, Troy, MI (US); Lei Hao, Troy, MI (US); Muhammad H. Alvi, Troy, MI (US); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 17/191,050

(22) Filed: Mar. 3, 2021

(65) Prior Publication Data

US 2022/0286072 A1    Sep. 8, 2022

(51) Int. Cl.
*H02P 21/00* (2016.01)
*H02P 21/22* (2016.01)
*H02M 7/5387* (2007.01)
*H02P 27/08* (2006.01)

(52) U.S. Cl.
CPC ........ *H02P 21/22* (2016.02); *H02M 7/53871* (2013.01); *H02P 27/08* (2013.01)

(58) Field of Classification Search
CPC ...... H02P 21/22; H02P 27/08; H02M 7/53871
USPC ...................................................... 318/400.02
See application file for complete search history.

(56) References Cited

U.S. PATENT DOCUMENTS

| | | | |
|---|---|---|---|
| 2010/0088441 A1* | 4/2010 | Peterson | B60L 1/003 710/110 |
| 2010/0127650 A1* | 5/2010 | Peterson | H02P 31/00 318/400.26 |
| 2016/0352277 A1* | 12/2016 | Sagawa | H02P 25/08 |
| 2017/0331401 A1* | 11/2017 | Sambonsuge | H02P 27/06 |

* cited by examiner

*Primary Examiner* — Erick D Glass

(57) ABSTRACT

A motor control system includes: a d-q target module configured to, based on a target torque of an electric motor, determine a first target d-axis current and a first target q-axis current; an offset module configured to, based on a capacitor current through capacitors connected across phases of the electric motor, determine a d-axis current offset and a q-axis current offset; an adder module configured to determine a second target d-axis current based on a sum of the first target d-axis current and the d-axis current offset and to determine a second target q-axis current based on a sum of the first target q-axis current and the q-axis current offset; and a driver module configured to, based on the second target d-axis current and the second target q-axis current, switch switches of a current source inverter (CSI) module configured to apply power to the phases of the electric motor.

20 Claims, 7 Drawing Sheets

CURRENT SOURCE INVERTER CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to inverters for motors of vehicles and more particularly to current source inverters and systems and methods for controlling current source inverters.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a motor control system includes: a d-q target module configured to, based on a target torque of an electric motor, determine a first target d-axis current for the electric motor and a first target q-axis current for the electric motor; an offset module configured to, based on a capacitor current through capacitors connected across phases of the electric motor, determine a d-axis current offset and a q-axis current offset; an adder module configured to determine a second target d-axis current based on a sum of the first target d-axis current and the d-axis current offset and to determine a second target q-axis current based on a sum of the first target q-axis current and the q-axis current offset; and a driver module configured to, based on the second target d-axis current and the second target q-axis current, switch switches of a current source inverter (CSI) module configured to apply power to the phases of the electric motor.

In further features, a capacitor current module is configured to determine the capacitor current based on at least one of (a) a current input to the CSI module, (b) a speed of the electric motor, and (c) a modulation index of the CSI module.

In further features, the capacitor current is measured using a current sensor.

In further features, the d-q target module is configured to determine the first target d-axis current and the first target q-axis current further based on a speed of the electric motor.

In further features, the driver module is configured to switch the switches of the CSI module further based on a d-axis current of the electric motor and a q-axis current of the electric motor.

In further features, the driver module is configured to switch the switches of the CSI module based on (a) a difference between a d-axis current of the electric motor and the second target d-axis current and (b) a difference between a q-axis current of the electric motor and the second target q-axis current.

In further features, a second driver module is configured to, based on the first target d-axis current and the first target q-axis current, switch switches of a voltage to current converter module configured to output current to the CSI module based on voltage from a battery.

In further features: a CSI target module is configured to, based on the first d-axis current and the first q-axis current, determine a target current output from a voltage to current converter module to the CSI module; and a second driver module is configured to, based on the target current, switch switches of the voltage to current converter module.

In further features, the second driver module is configured to switch the switches of the voltage to current converter module further based on a current output from the voltage to current converter module to the CSI module.

In further features, the second driver module is configured to switch the switches of the voltage to current converter module based on a difference between (a) a current output from the voltage to current converter module to the CSI module and (b) the target current output from the voltage to current converter module to the CSI module.

In further features, a capacitor is connected in parallel with the battery, and a voltage to current converter module is configured to convert voltage from the capacitor into current and to output the current to the CSI module.

In a feature, a motor control method includes: based on a target torque of an electric motor, determining a first target d-axis current for the electric motor and a first target q-axis current for the electric motor; based on a capacitor current through capacitors connected across phases of the electric motor, determining a d-axis current offset and a q-axis current offset; determining a second target d-axis current based on a sum of the first target d-axis current and the d-axis current offset; determining a second target q-axis current based on a sum of the first target q-axis current and the q-axis current offset; and based on the second target d-axis current and the second target q-axis current, switching switches of a current source inverter (CSI) module configured to apply power to the phases of the electric motor.

In further features, the motor control method further includes determining the capacitor current based on at least one of (a) a current input to the CSI module, (b) a speed of the electric motor, and (c) a modulation index of the CSI module.

In further features, the motor control method further includes measuring the capacitor current using a current sensor.

In further features, determining the first target d-axis current and the first target q-axis current includes determining the first target d-axis current and the first target q-axis current further based on a speed of the electric motor.

In further features, switching the switches of the CSI module includes switching the switches of the CSI module further based on a d-axis current of the electric motor and a q-axis current of the electric motor.

In further features, switching the switches of the CSI module includes switching the switches of the CSI module based on (a) a difference between a d-axis current of the electric motor and the second target d-axis current and (b) a difference between a q-axis current of the electric motor and the second target q-axis current.

In further features, the motor control method further includes, based on the first target d-axis current and the first target q-axis current, switching switches of a voltage to current converter module configured to output current to the CSI module based on voltage from a battery.

In further features, the motor control method further includes: based on the first d-axis current and the first q-axis current, determining a target current output from a voltage to current converter module to the CSI module; and based on the target current, switching switches of the voltage to current converter module.

In further features, switching the switches of the voltage to current converter module includes switching the switches of the voltage to current converter module further based on a current output from the voltage to current converter module to the CSI module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An inverter module of a vehicle includes legs of switches that regulate current flow (a) from a battery to an electric motor and (b) from the electric motor to the battery. A direct current (DC) bus capacitor may be connected between the inverter module and the battery.

The present application involves a voltage to current converter module and current source inverter (CSI) module. The CSI module regulates current flow to electric motor. A control module controls switching of the voltage to current converter module based on achieving a target current to the CSI module. The control module controls switching of the CSI module based on achieving target d and q-axis current commands.

Figure 1:
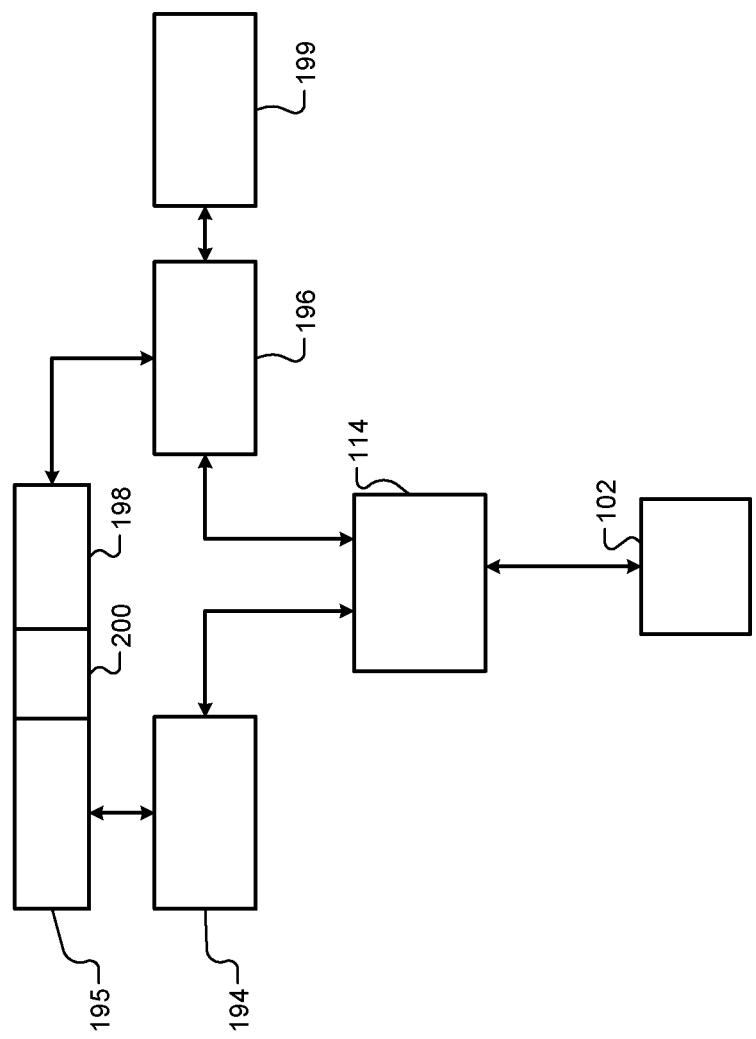
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
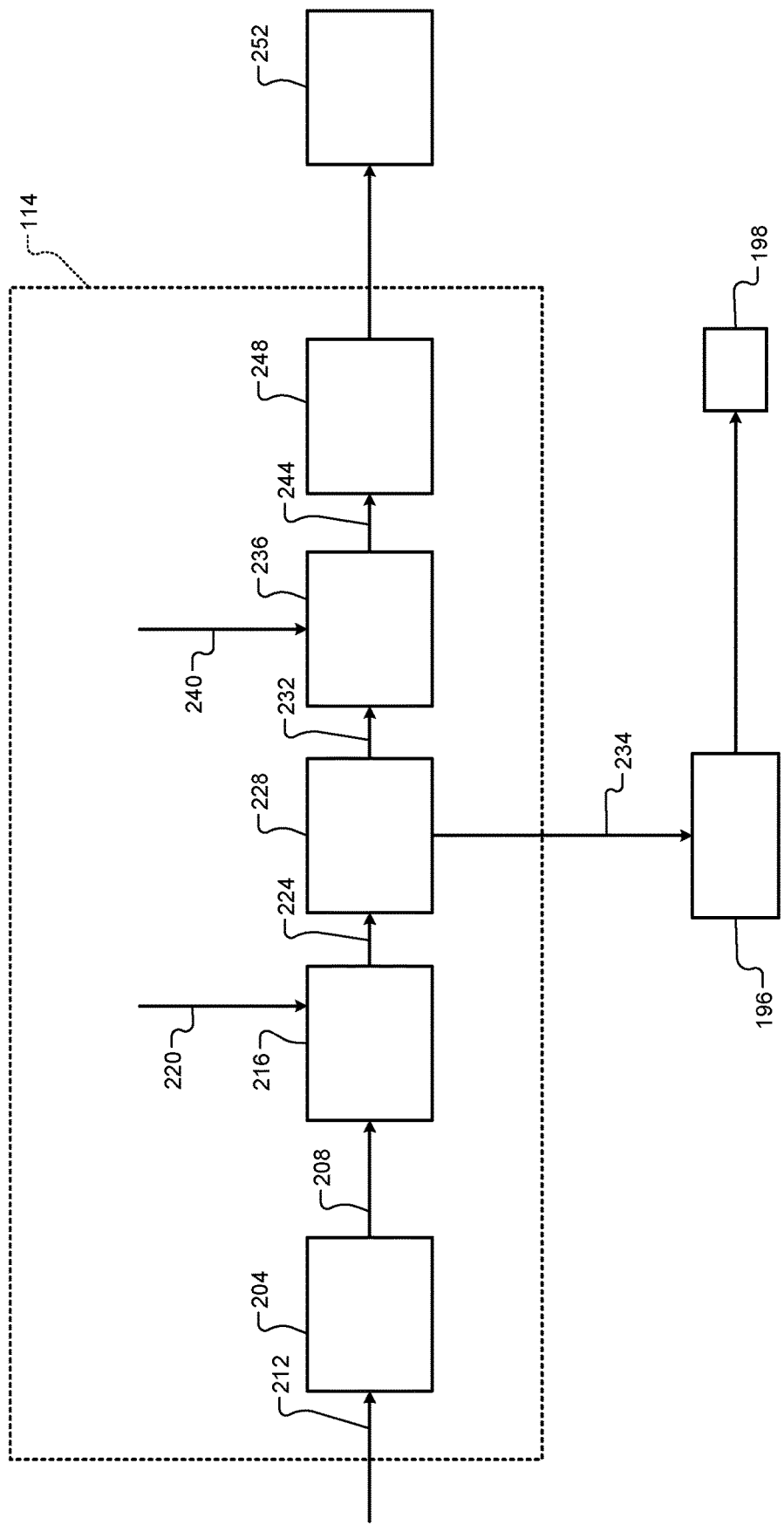
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 may determine the driver torque request 208 using on one or more lookup tables or equations that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request. In the example of an electric vehicle, the ECM 114 may be omitted, and the driver torque module 204 and the axle torque arbitration module 216 may be implemented within the motor control module 196.

In electric vehicles, the driver torque module 204 may input the driver torque request 208 to the motor control module 196 and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of a voltage to current (V/I) converter module and a current source inverter (CSI) module based on the motor torque request 234, as discussed further below. Switching of the V/I converter module controls current flow to the CSI module. Switching of the CSI module controls current flow to the electric motor 198. As such, switching of the CSI module controls torque of the electric motor 198. The CSI module also converts power generated by the electric motor 198 and outputs power for the battery 199, for example, to charge the battery 199.

The CSI module includes a plurality of switches. The motor control module switches the switches to apply alternating current (AC) power to the electric motor 198 to drive the electric motor 198. For example, the CSI module may generate n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198. The output shaft of the electric motor 198 is connected to one or more wheels of the vehicle.

In various implementations, one or more filters (e.g. capacitors) may be electrically connected between the inverter module and the battery 199. The one or more filters may be implemented, for example, to filter power flow to and from the battery 199. As an example, a filter including one or more capacitors and resistors may be electrically connected in parallel with the battery 199.

Figure 3:
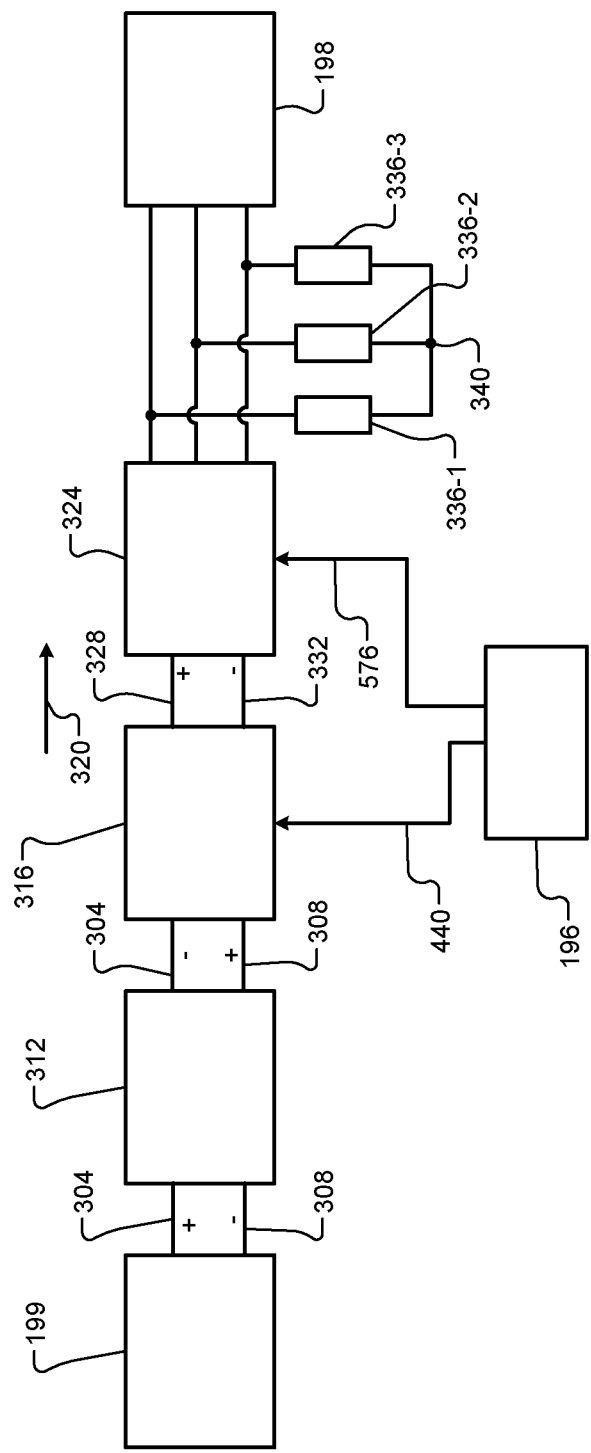
FIG. 3 includes a schematic including an example implementation of a power control system.

FIG. 3 includes a schematic including an example implementation of a power control system. The battery 199 may also be referred to or include a battery pack, as discussed above.

High (positive, DC+) and low (negative, DC−) sides 304 and 308 are connected to positive and negative terminals, respectively, of the battery 199. One or more capacitors, such as capacitor 312, are connected in parallel with the battery 199 between the high and low sides 304 and 308. The capacitor(s) filter power flow to and from the battery 199.

A voltage to current (V/I) converter module 316 converts voltage from the high and low sides 304 and 308 into a current source inverter (CSI) current 320. The V/I converter module 316 provides the CSI current 320 to a current source inverter (CSI) module 324 via second high and low sides 328 and 332.

The CSI module 324 includes three legs, one leg connected to each phase of the electric motor 198. The CSI module 324 controls current flow to the legs/phases of the electric motor 198. Capacitors 336-1, 336-2, and 336-3 are connected between a respective one of the legs and a common node 340.

Figure 4:
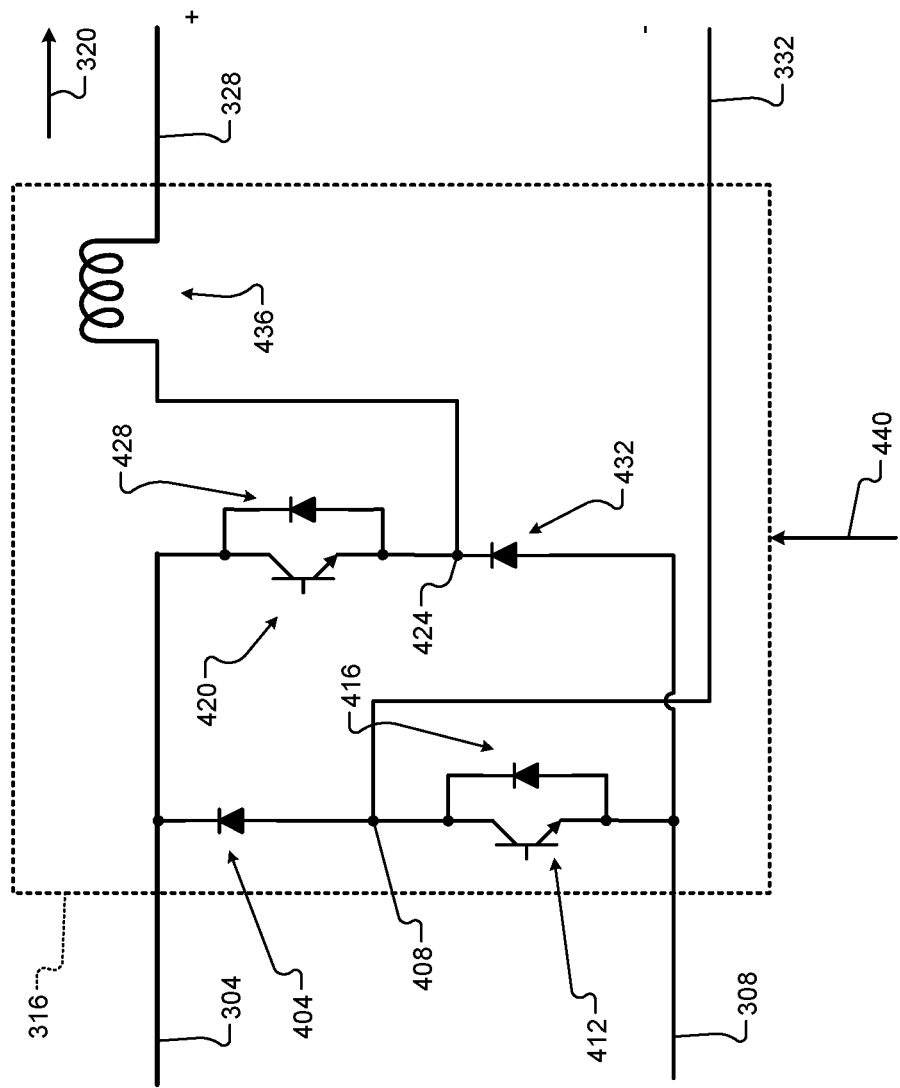
FIG. 4 includes a schematic of an example implementation of a voltage to current converter module.

FIG. 4 includes a schematic of an example implementation of the V/I converter module 316. A cathode of a first diode 404 is connected to the high side 304, and an anode of the first diode 404 is connected to a first node 408. The first node 408 is connected to the second low side 332.

A first terminal of a first switch 412 is connected to the first node 408. A second terminal of the first switch 412 is connected to the low side 308. A second diode 416 is connected anti-parallel to the first switch 412. In other words, a cathode of the second diode 416 is connected to the first terminal of the first switch 412, and an anode of the second diode 416 is connected to the second terminal of the first switch 412.

A first terminal of a second switch 420 is connected to the high side 304. A second terminal of the second switch 420 is connected to a second node 424. A third diode 428 is connected anti-parallel to the second switch 420. In other words, a cathode of the third diode 428 is connected to the first terminal of the second switch 420, and an anode of the third diode 428 is connected to the second terminal of the second switch 420.

A cathode of a fourth diode 432 is connected to the second node 424, and an anode of the first diode 404 is connected to the low side 332. A first end of an inductor 436 is connected to the second node 424, and a second end of the inductor 436 is connected to the second high side 328. The V/I converter module 316 outputs a CSI voltage to the CSI module 324.

Control terminals of the first and second switches 412 and 420 are connected to a V/I switch signal 440. The first and second switches 412 and 420 close when the V/I switch signal 440 is in a first state. The first and second switches 412 and 420 open when the V/I switch signal 440 is in a second state. The motor control module 196 generates the V/I switch signal 440 as discussed further below.

Each of the first and second switches 412 and 420 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

Figure 5:
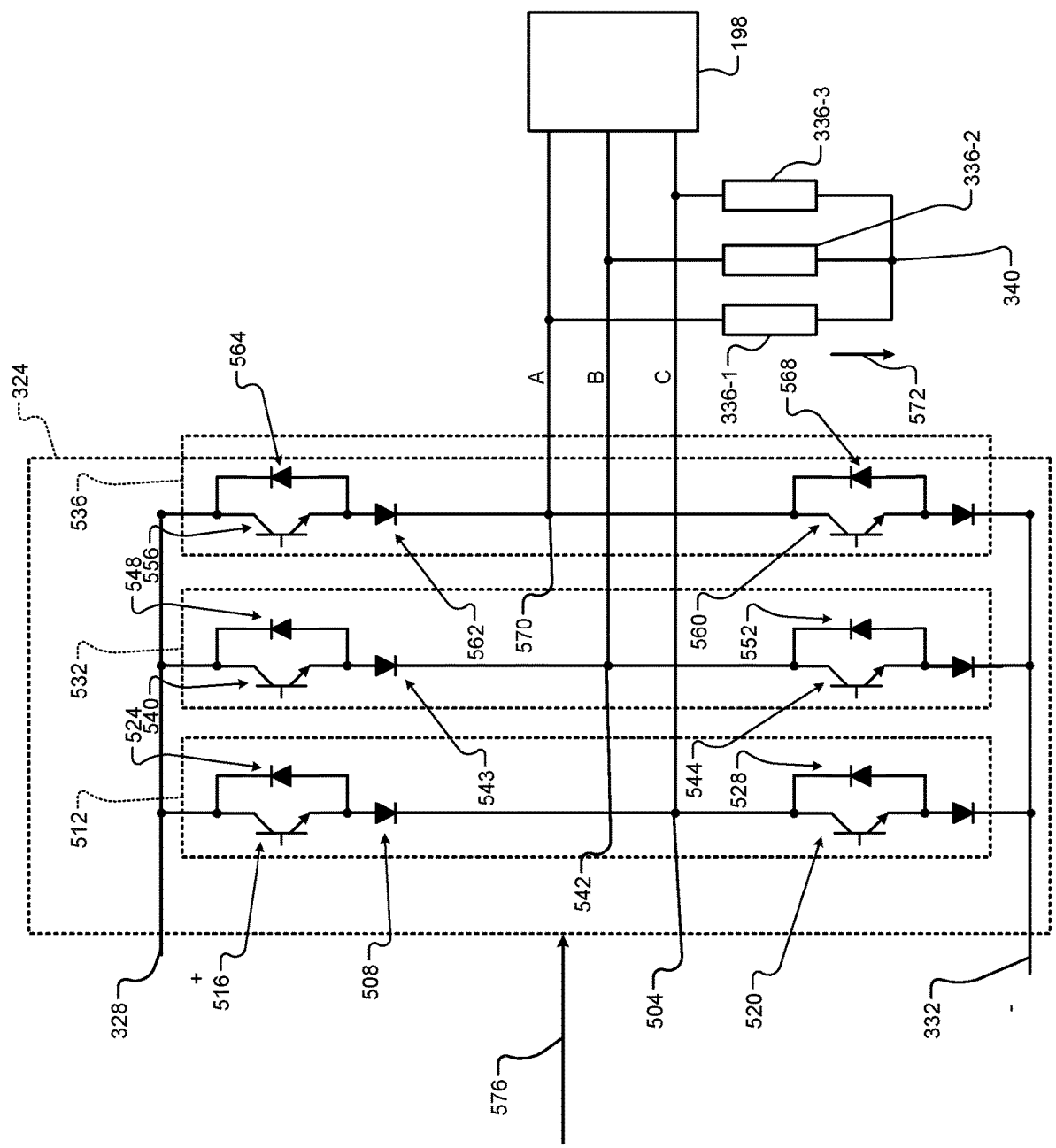
FIG. 5 includes a schematic of an example implementation of a current source inverter module.

FIG. 5 is a schematic of an example implementation of the CSI module 324. The CSI module 324 includes three legs. One leg is connected to each phase of the electric motor 198.

A first leg 512 includes first and second switches 516 and 520. The switches 516 and 520 each include a first terminal, a second terminal, and a control terminal. Each of the switches 516 and 520 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 516 is connected to the second high side 328. The second terminal of the first switch 516 is connected to a node 504 via a diode 508. In various implementations, bi-directional or reverse voltage blocking type switches may be used, and the diode 508 may be omitted. The second terminal of the second switch 520 may be connected to the second low side 332. The node 504 is connected to the second terminal of the first switch 516 and the first terminal of the second switch 520 is connected to a first phase (e.g., a) of the electric motor 198.

The first leg 512 may include first and second diodes 524 and 528 connected anti-parallel to the switches 516 and 520, respectively. In other words, an anode of the first diode 524 may be connected to the second terminal of the first switch 516, and a cathode of the first diode 524 may be connected to the first terminal of the first switch 516. An anode of the second diode 528 may be connected to the second terminal of the second switch 520, and a cathode of the second diode 528 may be connected to the first terminal of the second switch 520. The diodes 524 and 528 form one phase of a three-phase rectifier. However, the diodes 524 and 528 may be omitted. The diodes 524 and 528 may be included if included with a power module of an IGBT.

The CSI module 324 also includes second and third legs 532 and 536. The second and third legs 532 and 536 may be (circuitry wise) similar or identical to the first leg 512. In other words, the second and third legs 532 and 536 may each include respective switches and diodes like the switches 516 and 520 and the diodes 508, 524, and 528, connected in the same manner as the first leg 512. For example, the second leg 532 includes switches 540 and 544 and anti-parallel diodes 548 and 552. A node 542 connected to diode 543 and the first terminal of the switch 544 is connected to a second stator winding (e.g., b) of the electric motor 198. The third leg 536 includes switches 556 and 560, diode 562, and anti-parallel diodes 564 and 568. A node 570 connected to the diode 562 and the first terminal of the switch 560 is connected to a third stator winding (e.g., c) of the electric motor 198. Like the diodes 524 and 528, the diodes 548, 552, 564, and 568 may be omitted. The diodes 543 and 562 may also be omitted.

The capacitors 336-1, 336-2, and 336-3 are connected as shown. A capacitor current 572 flows through the capacitors 336-1, 336-2, and 336-3. A current sensor may measure the capacitor current 572, or the capacitor current 572 may be estimated, as described below.

Control terminals of the switches of the CSI module 324 are connected to CSI switch signals 576 from the motor control module 196. At least one high side switch of a leg and at least one low side switch of a leg are on at any given time. The motor control module 196 determines when and how long to turn on each switch and generates the CSI switch signals 576 accordingly.

Figure 6:
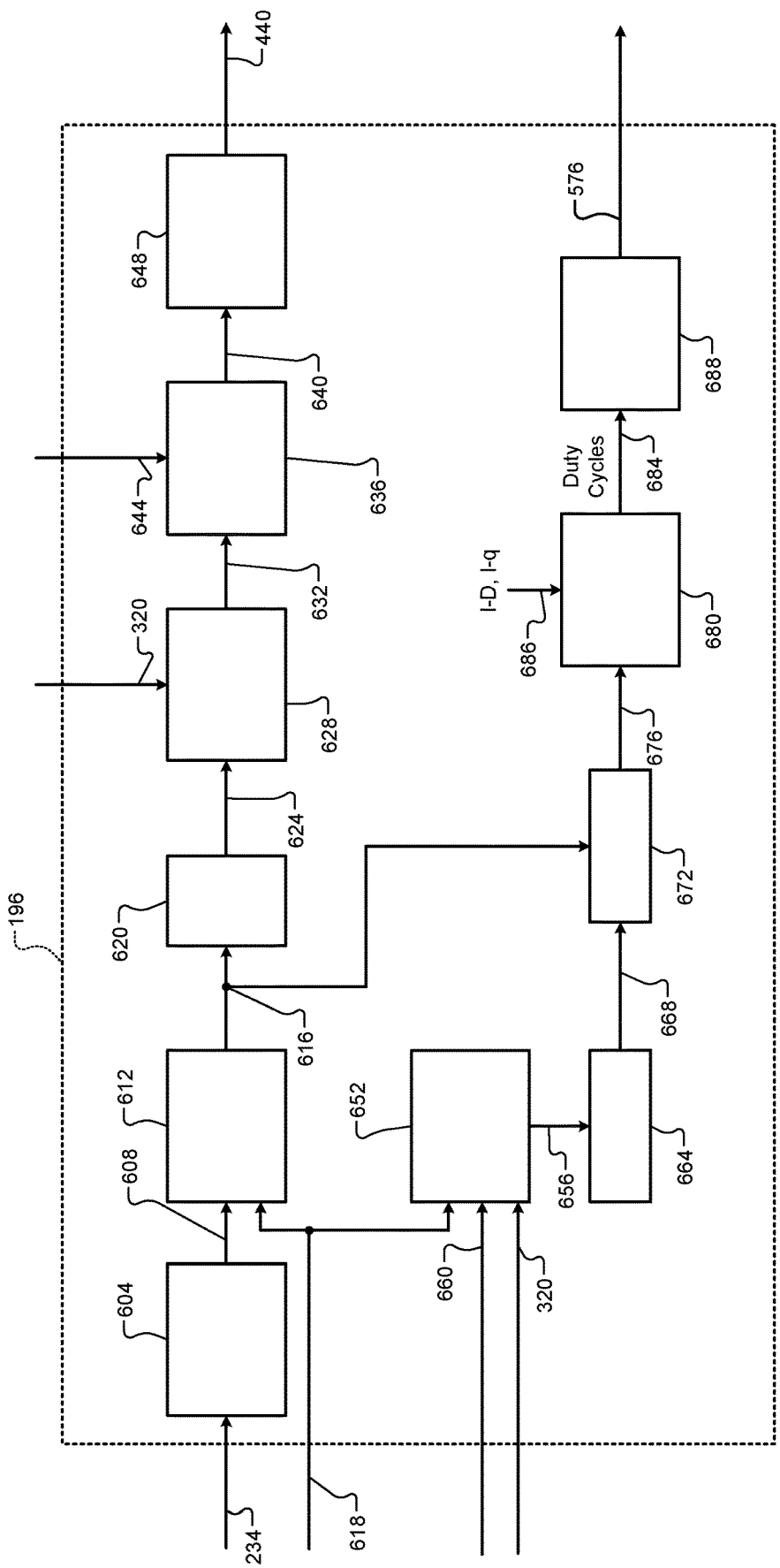
FIG. 6 includes a functional block diagram of an example implementation of a motor control module.

FIG. 6 is a functional block diagram of an example implementation of the motor control module 196. A target torque module 604 determines a target torque 608 based on the motor torque request 234. For example, the target torque module 604 may determine the target torque 608 using one of an equation and a lookup table that relates torque requests to target torques.

A d-q target module 612 determines an initial target d-axis current and an initial target q-axis current (collectively represented by 616) for the electric motor 198 based on the target torque 608 and a speed 618 of the electric motor 198 (motor speed). The speed 618 of the electric motor 198 may be measured using a sensor or estimated based on one or more parameters, such as currents to the phases of the electric motor 198. The d-q target module 612 may determine the initial target d and q-axis currents 616 using one or more equations or lookup tables that relate target torques and motor speeds to d and q-axis currents.

A CSI target module 620 determines a target CSI current 624 based on the initial target d and q-axis currents 616. The CSI target module 620 may determine the target CSI current 624 using one or more equations or lookup tables that relate target d and q axis currents to target CSI currents. The target CSI current 624 is a target value of the CSI current 320.

An error module 628 determines an error 632 based on a difference between the target CSI current 624 and the CSI current 320. The error module 628 may set the error 632 based on or equal to the target CSI current 624 minus the CSI current 320 or based on or equal to the CSI current 320 minus the target CSI current 624.

A closed loop module 636 adjusts a modulation index (MI) 644 for the V/I converter module 316 based on the error 632. For example, the closed loop module 636 may adjust the MI 640 to adjust the error 632 toward or to zero. The closed loop module 636 may include, for example, a proportional integral (PI) control module or another suitable type of closed loop control. The closed loop module 636 may adjust the MI 640 further based on an input voltage 644 to the V/I converter module 316. The input voltage 644 is the voltage across the high and low sides 304 and 308.

A driver module 648 generates the V/I switch signal 440 based on the MI 640, such as to achieve the MI 640.

A capacitor current module 652 determines a capacitor current 656 based on the motor speed 618, a MI 660 of the CSI module 324, and the CSI current 320. The capacitor current module 652 may determine the capacitor current 656, for example, using one or more equations and/or lookup tables that relate motor speeds, MIs, and CSI currents to capacitor currents. The capacitor current 656 is an estimated value of the capacitor current 572. In various implementations, the capacitor current module 652 may be omitted, and the capacitor current 572 may be measured and used in place of the capacitor current 656.

An offset module 664 determines d and q-axis current offsets 668 based on the capacitor current 656. The offset module 664 may determine the d and q-axis current offsets 668 using equations or lookup tables that relate capacitor currents to d and q-axis current offsets. The d and q-axis current offsets 668 may be the same or different values.

An adder module 672 adds the d and q-axis current offsets 668 to the initial target d and q-axis currents 616 to determine final target d and q-axis currents 676, respectively, for the motor 198. For example, the adder module 672 may set the final target d-axis current to the initial target d-axis current plus the d-axis current offset. The adder module 672 may set the final target q-axis current to the initial target q-axis current plus the q-axis current offset. In other words, the d and q-axis current output by d-q target module 612 plus the capacitor d and q-axis currents equals the motor d and q-axis currents.

A duty cycle module 680 generates duty cycles 684 for the legs of the CSI module 324 based on differences between the final target d and q-axis currents 676 and present d and q-axis currents 686, respectively. The duty cycle module 680 may generate the duty cycles, for example, using one of an equation and a lookup table that relates final d and q-axis currents to duty cycles. The present d and q-axis currents 686 may be determined, for example, based on the currents to the phases of the electric motor 198. The duty cycle of each leg may be the same. The duty cycle module 680 generates the duty cycles 684 using pulse width modulation (PWM) control.

A driver module 688 generates the CSI switch signals 576 for the switches of the legs based on the duty cycles 684. As stated above, the switches of each leg are controlled complementarily such that one of the switches of a leg is closed while the other switch of the leg is open. The switches of each leg may both be open at the same time, however. The phases of each leg, however, may be approximately 120 degrees apart as set by the CSI switch signals 576.

Figure 7:
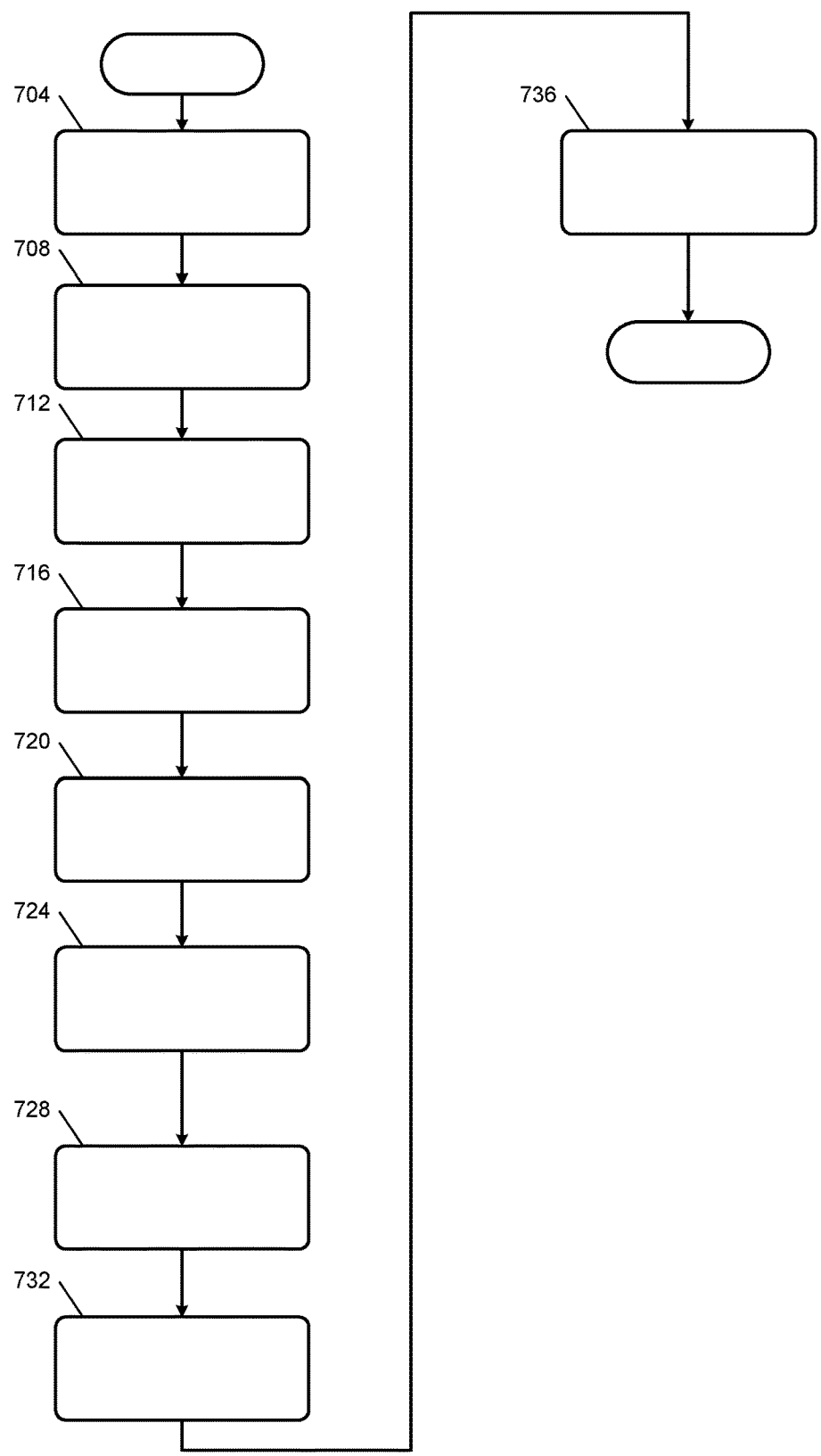
FIG. 7 is a flowchart depicting an example method of controlling a voltage to current converter module and a current source inverter module.

FIG. 7 is a flowchart depicting an example method of controlling the V/I converter module 316 and the CSI module 324. Control begins with 704 where the torque target module 604 determines the target torque 608 based on the motor torque request 234. At 708, the d-q target module 612 determines the initial target d and q-axis currents 616 based on the target torque 608.

At 712, the CSI target module 620 determines the target CSI current 624 input to the CSI module 324 based on the initial target d and q-axis 616. At 716, the error module 628 determines the error 632 based on the target CSI current 624 and the CSI current 320. At 720, the closed loop module 636 determines the MI 640 for the V/I converter module 316 based on the error 632, such as to adjust the error 632 toward or to zero.

At 724, the capacitor current module 652 determines the capacitor current 656 based on the MI CSI 660 and the CSI current 320 or the capacitor current 656 is measured using a current sensor. The offset module 664 determines the d and q-axis capacitor current offsets 608 based on the capacitor current 656 at 724. The capacitor current 656 may be measured using a sensor or estimated using the capacitor current module 652 as described above. At 728, the adder module 672 determines the final target d and q-axis currents 676 based on sums of the initial target d and q-axis currents 628 and the offsets 608, respectively.

At 732, the duty cycle module 680 determines the duty cycles 684 for the switches of the CSI module 324 based on the final target d and q-axis currents 676 and the d and q-axis currents 686. At 736, the driver module 648 switches the switches of the V/I converter module 316 based on the MI 640, and the driver module 688 switches the switches of the CSI module 324 based on the duty cycles 684. While the example of FIG. 7 is shown as ending, control may return to 704 for a next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A motor control system comprising:
  a d-q target module configured to, based on a target torque of an electric motor, determine a first target d-axis current for the electric motor and a first target q-axis current for the electric motor;
  an offset module configured to, based on a capacitor current through capacitors connected across phases of the electric motor, determine a d-axis current offset and a q-axis current offset;
  an adder module configured to determine a second target d-axis current based on a sum of the first target d-axis current and the d-axis current offset and to determine a second target q-axis current based on a sum of the first target q-axis current and the q-axis current offset; and
  a driver module configured to, based on the second target d-axis current and the second target q-axis current, switch switches of a current source inverter (CSI) module configured to apply power to the phases of the electric motor.

2. The motor control system of claim 1 further comprising a capacitor current module configured to determine the capacitor current based on at least one of (a) a current input to the CSI module, (b) a speed of the electric motor, and (c) a modulation index of the CSI module.

3. The motor control system of claim 1 wherein the capacitor current is measured using a current sensor.

4. The motor control system of claim 1 wherein the d-q target module is configured to determine the first target d-axis current and the first target q-axis current further based on a speed of the electric motor.

5. The motor control system of claim 1 wherein the driver module is configured to switch the switches of the CSI module further based on a d-axis current of the electric motor and a q-axis current of the electric motor.

6. The motor control system of claim 1 wherein the driver module is configured to switch the switches of the CSI module based on (a) a difference between a d-axis current of the electric motor and the second target d-axis current and (b) a difference between a q-axis current of the electric motor and the second target q-axis current.

7. The motor control system of claim 1 further comprising a second driver module configured to, based on the first target d-axis current and the first target q-axis current, switch switches of a voltage to current converter module configured to output current to the CSI module based on voltage from a battery.

8. The motor control system of claim 1 further comprising:
a CSI target module configured to, based on the first d-axis current and the first q-axis current, determine a target current output from a voltage to current converter module to the CSI module; and
a second driver module configured to, based on the target current, switch switches of the voltage to current converter module.

9. The motor control system of claim 8 wherein the second driver module is configured to switch the switches of the voltage to current converter module further based on a current output from the voltage to current converter module to the CSI module.

10. The motor control system of claim 9 wherein the second driver module is configured to switch the switches of the voltage to current converter module based on a difference between (a) a current output from the voltage to current converter module to the CSI module and (b) the target current output from the voltage to current converter module to the CSI module.

11. The motor control system of claim 1 further comprising:
the electric motor;
a battery;
a capacitor connected in parallel with the battery;
a voltage to current converter module configured to convert voltage from the capacitor into current and to output the current to the CSI module; and
the CSI module.

12. A motor control method comprising:
based on a target torque of an electric motor, determining a first target d-axis current for the electric motor and a first target q-axis current for the electric motor;
based on a capacitor current through capacitors connected across phases of the electric motor, determining a d-axis current offset and a q-axis current offset;
determining a second target d-axis current based on a sum of the first target d-axis current and the d-axis current offset;
determining a second target q-axis current based on a sum of the first target q-axis current and the q-axis current offset; and
based on the second target d-axis current and the second target q-axis current, switching switches of a current source inverter (CSI) module configured to apply power to the phases of the electric motor.

13. The motor control method of claim 12 further comprising determining the capacitor current based on at least one of (a) a current input to the CSI module, (b) a speed of the electric motor, and (c) a modulation index of the CSI module.

14. The motor control method of claim 12 further comprising measuring the capacitor current using a current sensor.

15. The motor control method of claim 12 wherein determining the first target d-axis current and the first target q-axis current includes determining the first target d-axis current and the first target q-axis current further based on a speed of the electric motor.

16. The motor control method of claim 12 wherein switching the switches of the CSI module includes switching the switches of the CSI module further based on a d-axis current of the electric motor and a q-axis current of the electric motor.

17. The motor control method of claim 12 wherein switching the switches of the CSI module includes switching the switches of the CSI module based on (a) a difference between a d-axis current of the electric motor and the second target d-axis current and (b) a difference between a q-axis current of the electric motor and the second target q-axis current.

18. The motor control method of claim 12 further comprising, based on the first target d-axis current and the first target q-axis current, switching switches of a voltage to current converter module configured to output current to the CSI module based on voltage from a battery.

19. The motor control method of claim 12 further comprising:
based on the first d-axis current and the first q-axis current, determining a target current output from a voltage to current converter module to the CSI module; and
based on the target current, switching switches of the voltage to current converter module.

20. The motor control method of claim 19 wherein switching the switches of the voltage to current converter module includes switching the switches of the voltage to current converter module further based on a current output from the voltage to current converter module to the CSI module.

* * * * *